May 11, 1937.  B. B. HOLMES  2,080,273
ELECTRIC TIMING SYSTEM
Filed Oct. 17, 1935
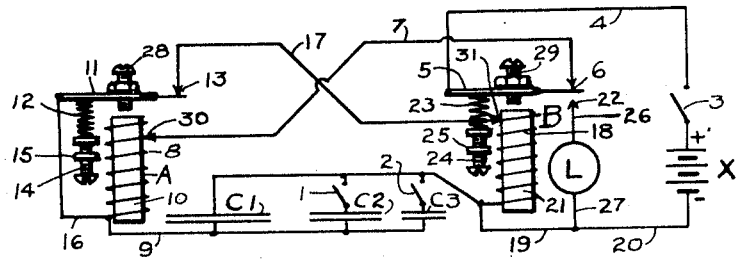
FIG 1
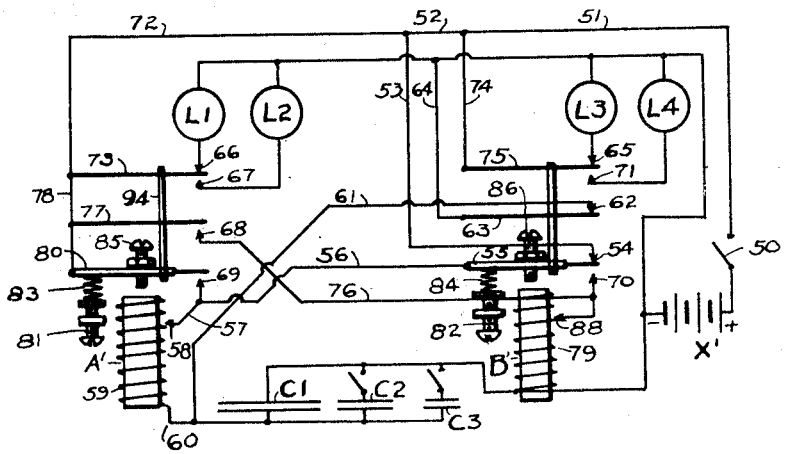
FIG 2
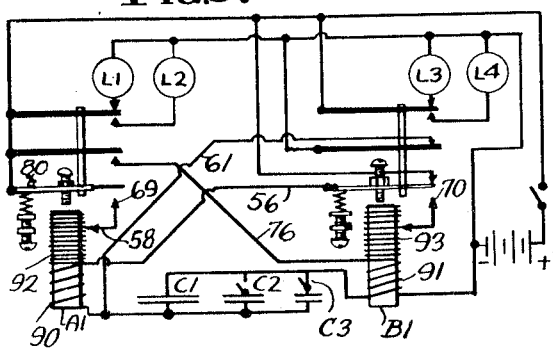
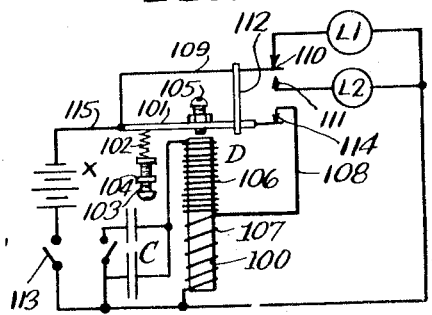
BRADFORD B. HOLMES
INVENTOR
BY John H. Hilliard
ATTORNEY Patented May 11, 1937

2,080,273

UNITED STATES PATENT OFFICE 2,080,273

ELECTRIC TIMING SYSTEM

Bradford B. Holmes, New York, N. Y.

Application October 17, 1935, Serial No. 45,517

16 Claims. (Cl. 175—320)

The present invention relates generally to electrical circuits which include means for automatically charging and discharging a condenser in cycles indefinitely repeated, the frequency of the cycles being uniform but capable of being increased or decreased and the lapsed time of charge and discharge respectively within the cycle being uniform as to each cycle but likewise capable of variation without substantially varying the frequency of the cycles.

The apparatus operates from a source of direct current and does not require the employment of any mechanical timing device. Provision is made in the circuits for changing the frequency of the cycles as well as for changing the lengths of the periods of charge and discharge.

The condenser charging current or the condenser discharging current, or both, may be used for the intermittent operation of load circuits, such as for the intermittent flashing of signal lights of various types—for example, traffic signals, buoy lights and the like, for the intermittent production of sounds, the intermittent operation of film projectors, and, in short, as a load circuit control in any situation where a high degree of accuracy in timing is required for the intermittent operation of any device.

In the drawing,

Fig. 1 shows the simplest form of circuit that I have devised to accomplish my purpose;

Fig. 2 shows a more efficient circuit than Fig. 1, advantage being taken of the fact that less current is necessary to hold the relay closed than to close it;

Fig. 3 shows another circuit for accomplishing my purpose which is distinguished from the circuit of Fig. 2 by the fact that in the former a special high-resistance holding coil is provided for operating the condenser charging and discharging circuits.

Fig. 4 shows still another modification in which a single relay unit is employed to control both the charging and discharging circuits.

Referring to Fig. 1, the circuit comprises relays A and B and one or more condensers $C_1$, $C_2$, and $C_3$ in parallel with each other and in series with the coils of the relays. In the case of certain of the condensers—for example, condensers $C_2$ and $C_3$, switches 1 and 2 may be provided for cutting them in and out of the circuit, thereby varying the capacitance. A source of current—for example, the battery X, is provided, and the circuit may be made and broken by the switch 3. When the relays are open, as shown in the figure, and the switch 3 is closed, current flows through the wire 4, the armature 5, the contact 6, the wire 7, sliding contact 30, the coil 8 of relay A, and thence by the wire 9 to the condenser (by which I mean one or more of the condensers, depending upon how many are in the circuit). This current energizes the relay core 10 which actuates the armature 11 against the compression of the spring 12, thus breaking the contact 13. The compression of the spring 12 may be varied by means of the screw 14, which is threaded in a fixed member 15.

As the condenser becomes charged or nearly charged, the charging current weakens, releasing armature 11 and consequently remaking contact 13. The condenser thereupon discharges through the wire 9, the wire 16, the armature 11, contact 13, the wire 17, the coil 18 of relay B, the wire 19, and the wire 20 to the negative terminal of the battery X. This discharge current energizes the core 21 of relay B and thereby, acting on the armature 5, breaks contact 6 and makes contact 22. Contact 6 is normally maintained by a compression spring 23, and the compression of the spring may be varied by screw 24 threaded in a fixed part 25. As contact 22 closes under the action of the condenser discharge current, current from the source flows through wire 4, armature 5, contact 22, wire 26, the load L, wire 27, wire 20, and the battery, which completes the circuit. As soon as the discharge of the condenser has been nearly completed, contact 6 is restored and the cycle is repeated.

The armature 11 is provided with residual magnetism adjustment screw 28, which serves not only as a residual magnetism contact but also as a means of varying the time required for charging the condenser or condenser system. Likewise, armature 5 is provided with a similar residual magnetism adjustment screw 29, which in the same way serves not only as a residual magnetism contact but as an adjustment whereby the time required for the discharge of the condenser may be varied.

The load may be, for instance, a lamp, a buzzer or the like. The time required for charging the condenser depends mainly upon the resistance of the coil 8 of relay A, the capacity of the condenser or condensers as the case may be, the applied voltage, the strength of the armature spring 12, and the setting of the screw 28. The resistance of the coil 8 may be varied by moving the sliding contact 30, and the resistance of the coil 18 of relay B may be varied by moving the sliding contact 31. The terminal voltage, of course, may be readily varied in conventional ways.

Varying the distance between the tip of the screw 29 and the core 21 of relay B obviously affects the amount of residual charge left in the condenser and thus operates to vary not only the time required for discharge but also time required for charging—in other words, the greater the residual charge left in the condenser, the less is the time required for the ensuing charge, and vice versa.

With relays of equal resistance and settings, the period of condenser charging current flow will be substantially equal to the period of discharging current flow, but, by changing the setting of one or both of the screws 28 and 29, or the position of the contacts 30 or 31, or the compression of the springs 12 and 23, the time ratio of charge and discharge can be varied as well as the frequency of the cycles. Also varying the capacitance of the condenser system, the frequency of the cycles can be varied. Of course, the lapsed time of a cycle may be also varied by varying the input voltage.

In Fig. 2 is shown a circuit that is more efficient than the circuit of Fig. 1, advantage being taken of the fact that substantially less current is required to hold a relay closed than is required to close it. In this circuit full voltage is used to close the relays, but the condenser, although charging through the coil of one relay, discharges through the coils of two relays in series. In addition, the condenser is substantially completely discharged at the end of each cycle—that is, at the end of each period of discharge current flow, so that the time necessary to charge the condenser for the next ensuing cycle is not affected by the presence of any residual charge left in it after the discharge period. By these means it is possible to greatly decrease the frequency of the cycles, even though other conditions be the same as in the circuit of Fig. 1. Furthermore, with the relays set most efficiently, at least four separate time periods of load current flow can be effected—one in each of four load circuits.

Before the switch 50 is closed, contacts 65, 62, 54, and 66 are closed, while contacts 67, 68, 69, 70, and 71 are opened. Upon the closing of the switch, current from the battery flows through the wires 51, 52, and 72, and reed 73, through the load L₁ to the negative terminal of the battery, thus actuating load L₁. Likewise, current flows through wire 51, wire 74, reed 75, contact 65, load L₃ to the negative terminal of the battery, thus actuating load L₃. However, almost instantaneously with the closing of the switch, current flows through the wire 51, wire 52, wire 53, contact 54, armature 55, wire 56, wire 57, sliding contact 58, coil 59 of the relay A', wire 60, wire 61, contact 62, reed 63, wire 64, to the negative terminal. Relay A' being actuated closes contacts 69, 68, and 67, thus breaking the circuit of load L₁ and establishing the circuit of load L₂. Also current flows through wires 51, 72, 78, reed 77, contact 68, wire 76, contact 88, coil 79, to the negative terminal. The current through relay winding 79 energizes the relay, breaking contacts 65, 62, and 54, and establishing contacts 71 and 70. The breaking of contact 62 cuts the condenser from the negative terminal. The circuit of load L₃ is likewise broken, and the circuit of load L₄ is established. Further, by the breaking of contact 54, the circuit through wire 56 is broken. Current now flows through contact 69, wire 57, contact 58, coil 59, and wire 60, thus charging the condenser. When the condenser is nearly charged, the charging current becomes so weak that the armature 80 is released, thus breaking contact 69 and the charging circuit. Contact 70 being closed, a condenser discharge circuit is established through the winding coils of both relays A' and B'. As the condenser becomes nearly discharged through the winding coils of relays A' and B', armature 55 of relay B' is released, and the cycle is complete, and the parts are restored to the position shown in Fig. 2, assuming that the switch 50 be closed. The same cycle is then repeated indefinitely.

It will be noted that during the discharge of the condenser, the coils of relays A' and B' are in series with each other and with the condenser, and therefore approximately twice as much time is required for the discharge of the condenser as for charging it. Furthermore, the condenser becomes substantially completely discharged, since, when relay B' opens, the residual charge in the condenser escapes by wire 61, contact 62, armature 63, wire 64, to the negative terminal of the source, this taking place before there is time for relay B' to close again. It will also be noted that each of the reeds 73 and 75 makes alternate contacts, thus permitting four load circuits, as shown—the loads being designated as L₁, L₂, L₃, and L₄, respectively. As in the case of the circuit of Fig. 1, these loads may be lamps, buzzers or other light or sound producing devices, or any other kind of apparatus that is required to be operated intermittently and which is capable of being operated by a load circuit controlled as herein described. As the circuit of Fig. 2 is actually arranged, current flows through load L₁ for approximately two-thirds of a cycle. This is true because contact 66 is closed during the discharge of the condenser, which, as stated above, requires about twice as much time to discharge as to charge. Current flows through load L₂ for about one-third of a cycle. This is true because contact 67 is closed only during the charging of the condenser. Current through load L₃ is for practical purposes instantaneous, being maintained only during the brief moment while contact 65 is closed. Current flows through load L₄ for nearly the entire cycle. This follows for the reason that contact 71 is closed throughout the time while the condenser is being charged except for a very brief moment and remains closed during the entire time of discharge of the condenser.

In the circuit of Fig. 2 I show means for varying the total time of charge and discharge (cycle frequency) of the condenser as well as for varying the time of charge and discharge with respect to each other and without varying the total time of the cycle. By means of the screws 81 and 82, the compression of the springs 83 and 84 may be varied, and by means of the screws 85 and 86 the gaps of the relays A' and B' may be varied. The condensers C₂ and C₃ are, as in Fig. 1, shown as provided with switches for cutting them in and out, whereby the capacitance of the condenser system may be varied. By means of sliding contacts 87 and 88, the resistance of the relay winding may be varied, with consequent variation in the time required for charge and discharge of the condenser.

In Fig. 3 the same reference characters are applied as in the case of corresponding parts of Fig. 2, new reference characters being used only where necessary to differentiate the circuits of Fig. 3 from those of Fig. 2. The circuits of Fig. 3 are similar to those of Fig. 2 except that in Fig. 3 the relays are provided not only with low-resistance closing coils 90 and 91 but also with additional high-resistance holding coils 92 and 93. It will be apparent that, before contact 69 is closed, current is flowing through the low-resistance coil 90 of relay A' which actuates the armature 80 and closes contact 69. Thereupon, an armature holding current flows through high-resistance coil 92. The coil is so designed, however, that only sufficient current passes to hold the relay closed, which results in corresponding efficiency of the system. The same is true in the case of the high-resistance holding coil 93 of relay B. A holding current flows through it as soon as contact 70 is closed.

The relays shown in Figs. 2 and 3 may be and, as I illustrate them, are of standard construction and are all similar. Taking relay A of Fig. 2, for example, it consists of the usual core, the coil 59, the armature 80, and the reeds 73 and 77—all connected in a unitary system by means of the insulating bar 94. Thus, the armature and the reeds operate in unison.

The apparatus of Fig. 4 employs a single relay unit for controlling both the charge and the discharge of the condenser. A battery X or other source of direct current is employed as in the cases of the previous figures.

The relay D comprises the usual core 100, armature 101, and, as in the previous figures, the compression spring 102, the compression of which may be varied by the spring adjustment screw 103 threaded in a fixed part 104. There is also the residual magnetism adjustment screw 105 which serves a purpose similar to the residual magnetism adjustment screws of the previous figures, namely, not only does it perform the function of a residual magnetism contact but it also serves the purpose of adjusting the position of the armature in the magnetic field of the core and thus varying the intensity of the magnetic force acting on it.

The relay D is provided with two coils 106 and 107 wound in such manner that, when energized by current from the wire 108, their magnetic fields neutralize or tend to neutralize each other but boost each other when energized by discharge current from the condenser C.

The armature 101 actuates a reed 109 operating in a double contact gap having the contacts 110 and 111. The actuation of the reed is through the link 112 connecting the armature 101 with the reed, being a similar construction to the corresponding devices of Figs. 2 and 3 except in this case only two load contacts are provided. When the switch 113 is closed, the load L₁ is actuated since, the contact 110 being closed, there is a complete circuit through it from the battery. The contact 114 also being closed, there is a complete circuit through the wire 115, armature 101, contact 114, wire 108, the two coils of the relay which are now in parallel, and the condenser C, which is in series with the coil 106, and thence to the negative terminal, the battery. Since the relay coils are now either neutralizing each other or bucking each other at least to such an extent that the differential magnetic effect is insufficient to operate the armature 101, the condenser is charged. As, however, the condenser becomes charged or nearly so, the current in coil 106 weakens, and, when it has dropped to a sufficient extent, the differential magnetic effect on the relay core causes the armature 101 to operate, thus breaking contacts 114 and 110 and making contact 111. The making of contact 111 closes a circuit from the battery through the load L₂, and the load L₂ is therefore put in operation.

Upon the breaking of contact 114, the condenser immediately discharges through coils 106 and 107 which are now in series with each other and with the condenser, the discharge current holding contact 114 open. When discharge is completed, the armature 101 is released, and the cycle is repeated, and so on indefinitely. The coil 107 is preferably of considerably lower resistance than coil 106.

In this apparatus the time of discharge will be longer than the time of charge owing to the increased resistance in the discharge circuit—that is, while the condenser is charging, the only resistance is coil 106, while discharge is slowed down by the additive resistance of the two coils. Change in the cycle frequency can be effected by adjustment of the screw 105.

It is recognized that the present invention may be embodied in other constructions than those herein specifically illustrated, and therefore it is desired that the constructions disclosed shall be considered as illustrative and not in a limiting sense.

I claim:

1. An electric timing system, comprising a source of direct current, a condenser, means providing a condenser charging circuit and a condenser discharge circuit and a load circuit, means controlled by the condenser charging current for rendering the discharge circuit inoperative while the condenser is charging and for rendering the discharge circuit operative after the condenser is substantially charged, means controlled by the condenser discharge current for rendering the condenser charging circuit inoperative while the condenser is discharging and for rendering it operative after the condenser is substantially discharged, one of said means being adapted to render the load circuit operative.

2. An electric timing system, comprising a source of direct current, a condenser, means providing a condenser charging circuit and a condenser discharge circuit and a load circuit, means controlled by the condenser charging current for rendering the discharge circuit inoperative while the condenser is charging and for rendering the discharge circuit operative after the condenser is substantially charged, means controlled by the condenser discharge current for rendering the condenser charging circuit inoperative while the condenser is discharging and for rendering it operative after the condenser is substantially discharged, the last-mentioned means being adapted to render the load circuit operative while discharge of the condenser is taking place and to render it inoperative while the condenser is being charged.

3. An electric timing circuit comprising a source of direct current, a condenser, means providing a condenser charging circuit and a condenser discharge circuit and a load circuit, means controlled by the condenser charging current for holding the discharge circuit open while the condenser is charging and for closing the discharge circuit after the condenser is substantially charged, means controlled by the condenser discharge current for holding the condenser charging circuit open while the condenser is discharging and for holding it closed after the condenser is substantially discharged, one of said means being adapted to render the load circuit operative.

4. An electric timing circuit comprising a source of direct current, a condenser, a relay, means providing a condenser charging circuit and a condenser discharge circuit and a load circuit, the condenser charging circuit including the winding of the relay, the relay being adapted under the control of the condenser charging circuit for rendering the discharge circuit inoperative while the condenser is charging and for rendering the discharge circuit operative after the condenser is substantially charged, means in the condenser discharge circuit and controlled by the condenser discharge current for rendering the condenser charging circuit inoperative while the condenser is discharging and for rendering it operative after the condenser is substantially discharged, one of said means being adapted to render the load circuit operative.

5. An electric timing system comprising a source of direct current, a condenser, means providing a condenser charging circuit and a condenser discharge circuit and a load circuit, means controlled by the condenser charging current for holding the discharge circuit open while the condenser is being charged, and means controlled by the condenser discharge current for holding the condenser charging circuit open while the condenser is being discharged, one of said means also operating to close the load circuit and maintain it closed while said discharge is taking place.

6. An electric timing system comprising a source of direct current, a condenser, means providing a condenser charging circuit and a condenser discharge circuit and a load circuit, means controlled by the condenser charging current for holding the discharge circuit open while the condenser is being charged, and means controlled by the condenser discharge current for holding the condenser charging circuit open while the condenser is being discharged, the last mentioned means also operating to close the load circuit and maintain it closed while said discharge is taking place.

7. An electric timing system comprising a source of direct current, a condenser, means providing a load circuit and a condenser charging circuit and a condenser discharge circuit, said means including a relay in the charging circuit with its winding coil in series with the condenser and adapted to be controlled by the charging current to hold the discharge circuit open while the condenser is being charged and to close the discharge circuit when the condenser has become charged and for maintaining the discharge circuit closed while the condenser is discharging, and a second relay having its winding in the condenser discharge circuit and in series with the condenser and adapted to be controlled by the condenser discharge current for holding the condenser charging circuit closed while the condenser is being charged and for opening the said charging circuit when the condenser has become charged and for holding the same open while discharge is taking place, said second relay also operating to close the load circuit and maintain it closed while said discharge is taking place.

8. An electric timing system comprising a source of direct current, a condenser, means providing a condenser charging circuit and a condenser discharge circuit, a relay in the discharge circuit, a second relay, the first-mentioned relay being adapted to close the second relay when the first-mentioned relay opens, the second relay being adapted by its closing to close the first-mentioned relay and establish a condenser charging circuit, the said second relay being adapted to remain closed and to hold the first relay closed while the condenser is charging, and to open when the condenser is substantially charged, means operated by the opening of said second relay for establishing a condenser discharge circuit through the coils of both relays, said means operating while discharge is taking place to hold the first-mentioned relay closed and to permit it to open when the condenser is substantially discharged.

9. An electric timing system comprising a source of direct current, a condenser, means providing a condenser charging circuit and a condenser discharge circuit and a load circuit, a relay in the discharge circuit, a second relay, the first-mentioned relay being adapted to close the second relay when the first-mentioned relay opens, the second relay being adapted by its closing to close the first-mentioned relay and establish a condenser charging circuit, the said second relay being adapted to remain closed and to hold the first relay closed while the condenser is charging, and to open when the condenser is substantially charged, means operated by the opening of said second relay for establishing a condenser discharge circuit through the coils of both relays, said means operating while discharge is taking place to hold the first-mentioned relay closed and to permit it to open when the condenser is discharged, one of said relays being adapted to open and close said load circuit.

10. An electric timing system comprising a source of direct current, a condenser, means for providing a condenser charging circuit and a condenser discharge circuit and a plurality of load circuits, a relay in the discharge circuit, a second relay, the first-mentioned relay being adapted to close the second relay when the first-mentioned relay opens, the second relay being adapted by its closing to close the first-mentioned relay and establish a condenser charging circuit, the said second relay being adapted to remain closed and to hold the first relay closed while the condenser is charging, and to open when the condenser is substantially charged, means operated by the opening of said second relay for establishing a condenser discharge circuit, said means operating while discharge is taking place to hold the first-mentioned relay closed and to permit it to open when the condenser is substantially discharged, certain of said load circuits being opened and closed by one of said relays and certain other of said load circuits being opened and closed by the other relay.

11. An electric timing system comprising a source of direct current, a condenser, a double coil relay, means providing a condenser charging circuit and a condenser discharge circuit and a load circuit, the said charging circuit including one of the coils of said relay and the discharge circuit including both coils of said relay, the said relay being adapted to cause the charging circuit to remain closed while the condenser is charging and to open the charging circuit when the condenser is substantially charged and to close the discharge circuit after the condenser has become substantially charged.

12. An electric timing system comprising a source of direct current, a condenser, a double coil relay so wound that when the coils are in parallel their magnetic fields oppose each other and when in series boost each other, means comprising a condenser charging circuit which includes one of said coils, and a condenser discharge circuit which comprises both of said coils in series, the said relay being adapted to hold the charging circuit closed while the condenser is being charged and to open the charging circuit when the condenser is substantially charged and to close the discharge circuit when the condenser has been substantially charged.

13. An electric timing system comprising a source of direct current, a condenser, a double coil relay, means comprising a condenser charging circuit which includes one of said coils and a condenser discharge circuit which comprises both of said coils in series, the said relay being adapted to hold the charging circuit closed while the condenser is being charged and to open the charging circuit when the condenser is substantially charged and to open the discharge circuit when the condenser has been substantially discharged.

14. An electric timing system comprising a source of direct current, a condenser, a double coil relay, one of the coils of which is of materially higher resistance than the other, said coils being so wound that when they are in parallel their magnetic fields oppose each other and when in series boost each other, means comprising a condenser charging circuit which includes the coil having the higher resistance and a condenser discharge circuit which comprises both of said coils in series, the said relay being adapted to hold the charging circuit closed while the condenser is being charged and to open the charging circuit and close the discharge circuit when the condenser has become substantially charged and to open the discharge circuit and close the charging circuit when the condenser has been substantially discharged.

15. An electric timing system comprising a source of direct current, a condenser, a double coil relay, means comprising a condenser charging circuit which includes one of said relays and a condenser discharge circuit which comprises both of said relays in series and a load circuit, the said relay being adapted to hold the charging circuit closed while the condenser is being charged and to open the charging circuit when the condenser is substantially charged and to open the discharge circuit when the condenser has been substantially discharged, said relay being adapted to alternately open and close said load circuit.

16. An electric timing system comprising a source of direct current, a condenser, a double coil relay so wound that when the coils are in parallel their magnetic fields oppose each other, means comprising a condenser charging circuit which includes one of said coils and a condenser discharge circuit which comprises both of said coils in series and a load circuit, the said relay being adapted to hold the charging circuit closed while the condenser is being charged and to open the charging circuit when the condenser is substantially charged and to close the discharge circuit when the condenser has been substantially charged, said relay being adapted to alternately open and close said load circuit.

BRADFORD B. HOLMES.